US006874031B2

United States Patent
Corbeil

(10) Patent No.: US 6,874,031 B2
(45) Date of Patent: Mar. 29, 2005

(54) METHOD AND APPARATUS FOR SHARING AUTHENTICATION SESSION STATE IN A GLOBAL DISTRIBUTED NETWORK

(75) Inventor: Ryn C. Corbeil, Lakeside, CA (US)

(73) Assignee: Qualcomm Inc., San Diego, CA (US)

(*) Notice: Subject to any disclaimer, the term of this patent is extended or adjusted under 35 U.S.C. 154(b) by 87 days.

(21) Appl. No.: 10/267,997

(22) Filed: Oct. 7, 2002

(65) Prior Publication Data

US 2004/0068573 A1 Apr. 8, 2004

(51) Int. Cl.[7] .............................................. G06F 15/16
(52) U.S. Cl. ........................ 709/229; 709/203; 709/217; 709/225; 709/227; 709/228; 713/200; 713/201; 713/202; 707/10
(58) Field of Search ................................ 709/229, 203, 709/217, 225, 227, 228; 713/200, 201, 202; 707/10

(56) References Cited

U.S. PATENT DOCUMENTS

| 4,672,572 A | * | 6/1987 | Alsberg ...................... 713/202 |
| 6,014,669 A | * | 1/2000 | Slaughter et al. ............. 707/10 |
| 6,292,835 B1 | * | 9/2001 | Huang et al. ............... 709/235 |
| 6,557,038 B1 | * | 4/2003 | Becker et al. .............. 709/227 |
| 2003/0225827 A1 | * | 12/2003 | Andersen et al. ........... 709/203 |

* cited by examiner

Primary Examiner—Ario Etienne
Assistant Examiner—Yves Dalencourt
(74) Attorney, Agent, or Firm—Philip Wadsworth; Robert O'Connell

(57) ABSTRACT

A method and apparatus for accessing a destination web site in a global communication network through a cluster of web server proxies is presented. Login information and user activity information are shared among the nodes of the cluster on a weighted basis such that an active user is not prematurely logged off while advantageously traffic load is reduced.

8 Claims, 3 Drawing Sheets

METHOD AND APPARATUS FOR SHARING AUTHENTICATION SESSION STATE IN A GLOBAL DISTRIBUTED NETWORK

FIELD

The present invention relates to sharing authentication session state in a global distributed network, such as the Internet. More specifically, the present invention relates to methods and apparatus for efficiently updating the nodes of a cluster of web server proxies whenever a user accesses a node of the cluster, such that an active user is not prematurely logged off while advantageously traffic load is reduced.

BACKGROUND

When a user attempts to access a destination web site or server in a global distributed network, such as the Internet, a web server proxy (WSP) authenticates the user by presenting a login form and soliciting user credentials the first time the user attempts to access the destination web site. The WSP is a service that transparently proxies the destination web server and intercepts the requests from the user to the destination web site and forwards the requests to the destination web site, subject to authentication and access filters.

If the user provides the proper credentials, WSP authorizes an active session for that user, forwards the user's request(s) to the destination web site, and conveys any response received from the destination web site back to the user. The session may expire after some configurable time period of user inactivity, such that a subsequent request from the same user that is received after such time period requires authentication. WSP may also maintain a history of the user's failed authentication attempts, which may be due to providing invalid credentials, and lock out the user after some configurable number of failed login attempts.

In many situations it is desirable to cluster a number of WSPs so as to support more users than can be accommodated by a single WSP. To cluster WSPs, an instance of the service may run on two or more computers, which may be supported by a load balancer. Because a series of requests from one user most probably is handled by more than one node of the WSP cluster, the clustered WSPs should share session state information, which may consist of user authentication status or failed login attempts.

Currently, a centralized database or a session server is used for keeping track of the users session state information. When a cluster node receives a request from a user, the cluster node refers to the data base or the server to determine whether an active session has been established for the user or, otherwise, a failed login-attempt count is recorded for the user, as the case may be.

The problem with using a centralized database or session server for sharing users session state information is that if the database or the session server fails, the cluster cannot properly authenticate the user. That is, a user may be prematurely terminated, get to attempt more than the pre-determined login-attempt limit, or have to provide unnecessary login credentials.

There is a need, therefore, for mechanisms to provide a cluster of WSP nodes and efficiently share user session state information among the WSP nodes.

SUMMARY

The disclosed embodiments provide novel and improved methods and apparatus for accessing a destination web site in a global communication network. In one aspect, a method for logging a user on a global distributed network comprises receiving a request from the user at a node of a server proxy cluster, prompting the user for login information, and receiving login information from the user. If the received login information is valid, the method further includes setting up an active session for the user and updating at least one node of the server proxy cluster with information that the active session is still in use.

In another aspect, a method for accessing a server in a global distributed network comprises receiving a request from the user at a node of a server proxy cluster and determining whether an active session is established for the user. If an active session is established for the user, the method further includes updating at least one node of the server proxy cluster with information that the active session is still in use.

In another aspect, an apparatus for accessing a server in a global distributed network comprises a memory unit, a receiver, a transmitter, and a processor communicatively coupled with the memory unit, the receiver, and the transmitter. The processor is capable of executing instructions to carry out the above-mentioned methods.

BRIEF DESCRIPTION OF THE DRAWINGS

The features and advantages of the present invention will become more apparent from the detailed description of disclosed embodiments set forth below when taken in conjunction with the drawings, and wherein.

DETAILED DESCRIPTION

Figure 1:
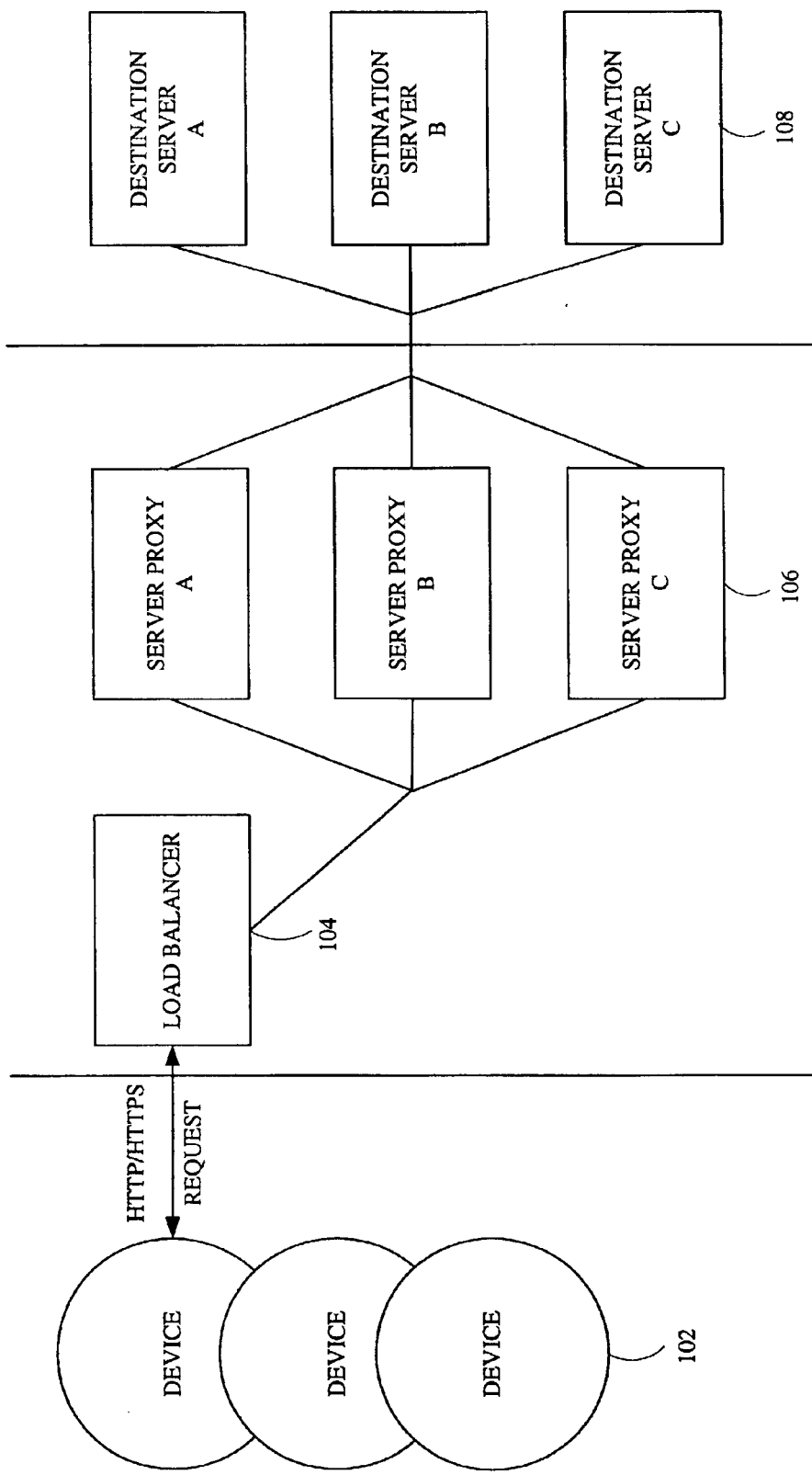
FIG. 1 illustrates a cluster of web server proxies for accessing a destination web site.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a cluster of web server proxies (WSPs) for accessing a destination web site, according to one embodiment. Devices 102 include wireless phones, personal data assistants (PDAs), laptop computers, and the like. A user uses a device 102 to make a request to access a destination server, such as a web site. The request includes a hypertext transfer protocol (HTTP) format request. The WSP associates a request with its respective user using a header field containing a value unique to the user, the user's device, or the source internet protocol (IP) address of the request. The requests arrive at a load balancer/scheduler 104, which distributes the incoming requests among the nodes of the WSP cluster 106. Load balancer/scheduler 104 distributes the requests based on a number of load distribution schemes, such as a round-robin scheme.

WSP cluster 106 is a service that proxies a web server and intercepts the requests received from the user, caches the requests, and forwards them to the destination web site, subject to authentication and access filters. In one embodiment, a number of WSPs are clustered so as to support more users than can be accommodated by a single WSP. To cluster WSPs, an instance of the service runs on two or more computers. Because a series of requests from one user most probably is handled by more than one node of the WSP cluster, the clustered WSPs share session state information. The session state information includes user's login status and/or failed login-attempt, as the case may be.

The WSP cluster shares the session state information to prevent premature session termination for a user before a configurable time period of inactivity assigned to the user has actually expired. That is, after the user's first request arrives at a first node of the WSP cluster, and an active session is established for the user, a configurable inactivity time period is assigned to the user so that if no subsequent request is received from the user during the inactivity time period, the assigned session is terminated.

The WSP cluster shares the session state information among the nodes of the WSP cluster to prevent the user from unsuccessfully attempting to login beyond the allowed number of unsuccessful login attempts. That is, after the user's first request arrives at a first node of the WSP cluster, but it is not properly authenticated, the user is allowed a certain number of unsuccessful attempts before the user is locked out, regardless of which cluster node receives the user's login request. Otherwise, if the user unsuccessfully keeps attempting to login but the user's login credentials arrive at different nodes of the WSP cluster, and the allowed limit of unsuccessful login attempts has not reached at any one of such nodes, the user would be mistakenly allowed to attempt to login beyond the allowed limit.

In one embodiment, when a user attempts to access a destination web site or server in a global distributed network, such as the Internet, and the user's first request arrives at a first node of the WSP cluster, the first node of the WSP cluster starts the process of authenticating the user. The first node presents the user with a login form and solicits user's credentials the first time the user attempts to access the destination web site. If the user provides the valid credentials, the first node of the WSP authorizes the user and establishes an active session for the user.

The first node of the cluster then updates other nodes of the WSP cluster with the information that the active session is established for the user, such that subsequent requests from the same user, as long as the user has not been inactive longer than the allowed inactivity time period, do not require authentication. Sharing the session information with other nodes of the cluster includes broadcasting or multicasting the session state information to other nodes. The first node may store the session information at its local list and may start a timer, indicating the start of the active session for the user. The rest of the cluster nodes may also, after receiving session information from the first node, store the session information for the user in their respective local lists, and start their respective timers, indicating the start of the active session for the user. Advantageously, if any node of the WSP cluster becomes inoperative, the remaining nodes stay intact and operate properly. The first node of the WSP cluster then forwards the user's original request to the destination web site, receives a response from the destination web site, and conveys the response received from the destination web site back to the user.

If a second request from the same user arrives at a second node of the cluster, the second node refers to its local list and/or its timer to retrieve session state information for the user. If the session information and/or the timer indicate that the session that has been established for the user is still active, the second node advantageously does not need to authenticate the user again. The second node updates some or all of the other nodes of the WSP cluster with information that the user is still active, so that the user's active session would not be prematurely terminated by the other nodes of the cluster. The second node may update the other nodes on a weighted basis.

The weighted basis scheme includes updating some or all of the other nodes of the cluster relative to the elapsed time since the user's last request, e.g., the longer the elapsed time the more probability of updating the nodes. The weighted basis scheme includes updating some or all of the other nodes of the cluster relative to the number of nodes of the cluster, e.g., the more nodes in the cluster, the more probability of updating the nodes. The weighted basis scheme includes updating some or all of the other nodes of the cluster relative to the elapsed time since the user's last request as well as the number of nodes in the cluster.

The weighted updating scheme includes updating some or all of the nodes of the cluster based on a probability function that increases with some factors, such as the elapsed time since the user's last request, the number of nodes of the cluster, the type of the request, the identity or type of the requester, and the like. For example, some or all nodes of the cluster may be updated with high probability if the elapsed time since last request at a node is relatively large and/or the number of nodes of the cluster are relatively large. The weighted-basis updating scheme probabilistically ensures that the active user, whose requests arrive at different nodes of the cluster, is not prematurely logged off, while advantageously reducing traffic load compared to updating all of the cluster nodes whenever a request is received from the user.

Figure 2:
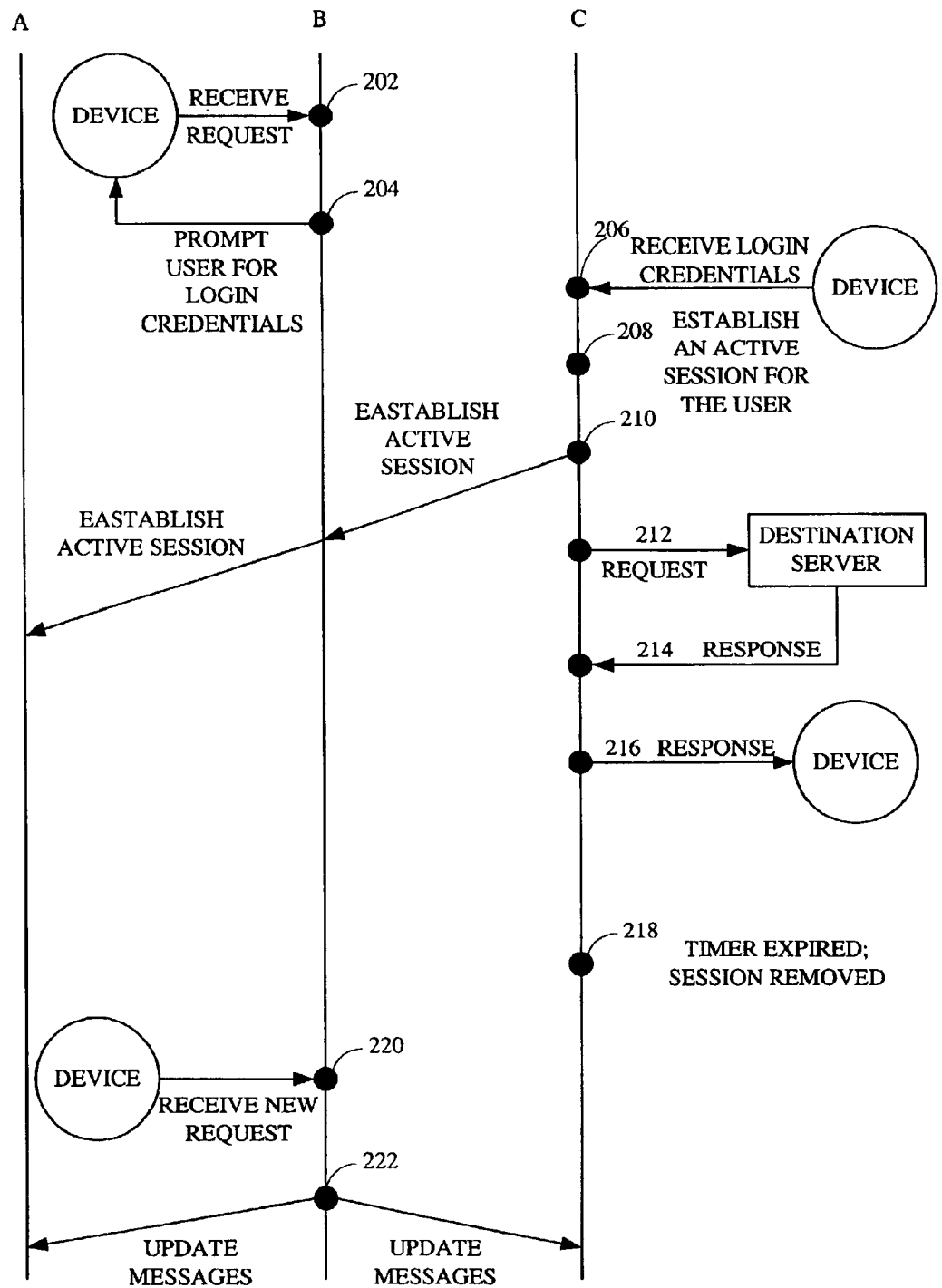
FIG. 2 illustrates a timing diagram for accessing a destination web site.

FIG. 2 illustrates a timing diagram for accessing a destination web site through a WSP cluster, according to one embodiment. The WSP cluster includes three WSP nodes, A, B, and C. When the user attempts to access a destination web site or server in a global distributed network, such as the Internet, and the user's first request arrives, for example, at node B of the WSP cluster, at time 202, node B starts the process of authenticating the user, at time 204. Node B prompts the user for login credentials, such as user identification and/or password. After the user provides login credentials, the user's login credentials, however, may arrive at a different node of the WSP cluster. For example, the user's login credentials arrives at node C, at time 206. If the user provides valid login credentials, node C authorizes the user, establishes an active session for the user, caches the user's request, and starts a timer, at time 208.

At time 210, node C broadcasts an update message, e.g., "Add_Session_User_ID," to nodes A and B of the WSP cluster, informing nodes A and B that an active session is established for the user having the designated identification information. Nodes A and B update their respective local lists and/or start their respective timers, indicating that an active session is established for the user. Node C sends the user's original request to the destination server, at time 212; receives a response from the destination server, at time 214; and forwards the response to the user, at time 216.

At time 218, the timer at node C expires due to the user being inactive for longer than the allowed inactivity time period. Accordingly, node C may remove the user's session from its local list. However, the timer(s) at nodes A and B have not reached such limit yet; thus, these nodes have not removed the active session from their local lists. When a new request from the same user arrives at node B, at time 220, node B resets its own timer, and broadcasts an update signal, e.g., "Keep_Session_Alive_User_ID," at time 222, to nodes A and C, or only to node C, whose timer has expired. Nodes A and C, or only C, as the case may be, update their local lists and start their respective timers.

In this example, since the number of the nodes in the cluster is relatively small, updating other nodes, for example nodes A and C, may be based on the relative timer value at node B. For example, if the timer value at node B is relatively small, nodes A and C may not be updated, or updated with a relatively low probability; thus saving traffic and processing time. Otherwise, if the timer value at node B is relatively large, nodes A and C are updated with a relatively high probability, increasing the likelihood that the active session for the user is not unexpectedly terminated.

Figure 3:
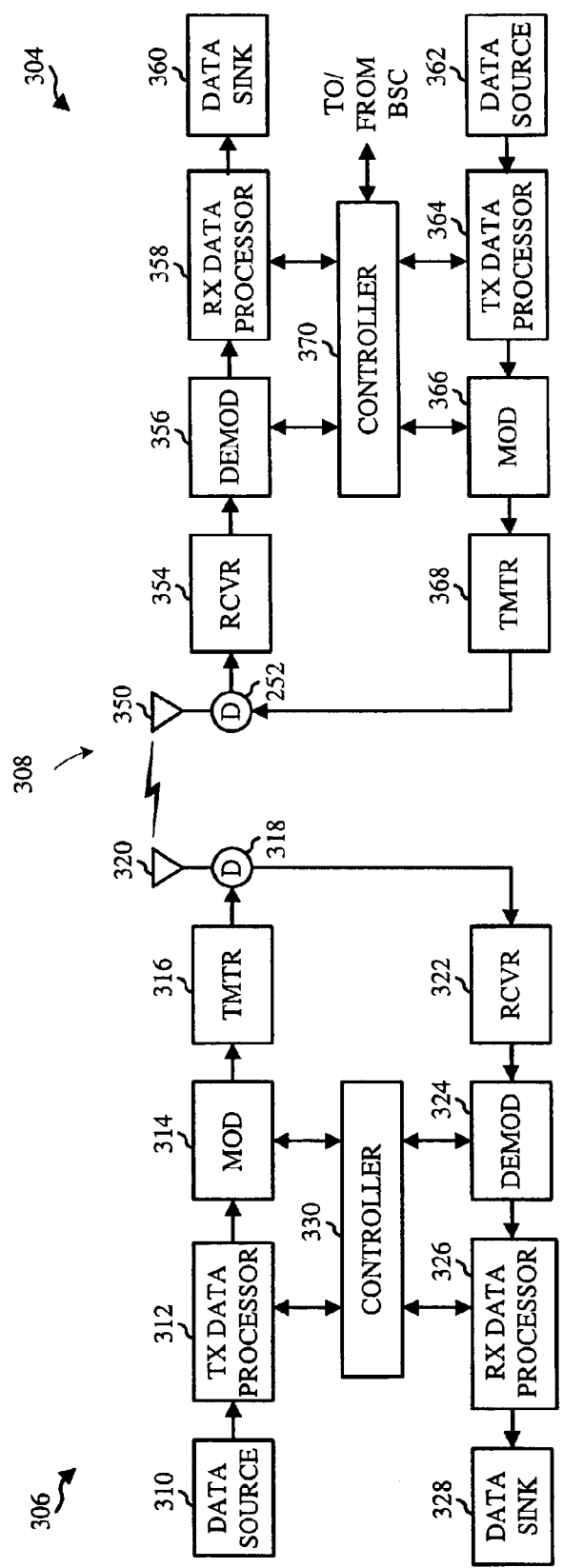
FIG. 3 illustrates an embodiment for a web server and a remote access device.

FIG. 3 is a simplified block diagram of an embodiment of web server 304 and remote access device 306, which are capable of implementing various disclosed embodiments. For a particular communication, voice data, packet data, and/or messages may be exchanged between web server 304 and remote access device 306, via an air interface 308. Various types of messages may be transmitted, such as messages used to establish a communication session between the web server and remote access device, registration and paging messages, and messages used to control a data transmission (e.g., power control, data rate information, acknowledgment, and so on). Some of these message types are described in further detail below.

For the reverse link, at remote access device 306, voice and/or packet data (e.g., from a data source 310) and messages (e.g., from a controller 330) are provided to a transmit (TX) data processor 312, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 314 and further processed (e.g., covered, spread with short PN sequences, and scrambled with a long PN sequence assigned to the user terminal). The modulated data is then provided to a transmitter unit (TMTR) 316 and conditioned (e.g., converted to one or more analog signals, amplified, filtered, and quadrature modulated) to generate a reverse link signal. The reverse link signal is routed through a duplexer (D) 318 and transmitted via an antenna 320 to web server 304.

At web server 304, the reverse link signal is received by an antenna 350, routed through a duplexer 352, and provided to a receiver unit (RCVR) 354. Web server 304 may receive registration information and status information, e.g., mobile station mobility rate, from remote access device 306. Receiver unit 354 conditions (e.g., filters, amplifies, down converts, and digitizes) the received signal and provides samples. A demodulator (DEMOD) 356 receives and processes (e.g., despreads, decovers, and pilot demodulates) the samples to provide recovered symbols. Demodulator 356 may implement a rake receiver that processes multiple instances of the received signal and generates combined symbols. A receive (RX) data processor 358 then decodes the symbols to recover the data and messages transmitted on the reverse link. The recovered voice/packet data is provided to a data sink 360 and the recovered messages may be provided to a controller 370. Controller 370 may include instructions for paging a group of mobile stations, which may be based on the mobility of the mobile stations. The processing by demodulator 356 and RX data processor 358 are complementary to that performed at remote access device 306. Demodulator 356 and RX data processor 358 may further be operated to process multiple transmissions received via multiple channels, e.g., a reverse fundamental channel (R-FCH) and a reverse supplemental channel (R-SCH). Also, transmissions may be simultaneously from multiple mobile stations, each of which may be transmitting on a reverse fundamental channel, a reverse supplemental channel, or both.

On the forward link, at web server 304, voice and/or packet data (e.g., from a data source 362) and messages (e.g., from controller 370) are processed (e.g., formatted and encoded) by a transmit (TX) data processor 364, further processed (e.g., covered and spread) by a modulator (MOD) 366, and conditioned (e.g., converted to analog signals, amplified, filtered, and quadrature modulated) by a transmitter unit (TMTR) 368 to generate a forward link signal. The forward link signal is routed through duplexer 352 and transmitted via antenna 350 to remote access device 306. Forward link signals include paging signals.

At remote access device 306, the forward link signal is received by antenna 220, routed through duplexer 318, and provided to a receiver unit 322. Receiver unit 322 conditions (e.g., down converts, filters, amplifies, quadrature modulates, and digitizes) the received signal and provides samples. The samples are processed (e.g., despreaded, decovered, and pilot demodulated) by a demodulator 324 to provide symbols, and the symbols are further processed (e.g., decoded and checked) by a receive data processor 326 to recover the data and messages transmitted on the forward link. The recovered data is provided to a data sink 328, and the recovered messages may be provided to controller 330. Controller 330 may include instructions for registering remote access device 306, which may be based on the mobility of the mobile station.

Therefore, the disclosed embodiments provide for a significant improvement in system reliability by distributing authentication and session information among the nodes of a cluster of web server proxies. The disclosed methods and apparatus also provide for reducing traffic load in accessing a destination server in a global communication network.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration."

What is claimed is:

1. A method for accessing a server in a global distributed network, the method comprising:
   (a) receiving a request from a user at a node of a server proxy cluster;
   (b) determining whether an active session is established for the user;
   (c) sending the request to the server if an active session is established for the user; and
   (d) updating at least one node of the server proxy cluster with information that the active session is established for the user;
   wherein said updating includes updating at least one of the nodes of the server proxy cluster based on a probability function that increases with a timer value at a node of the server proxy cluster.

2. A method for accessing a server in a global distributed network, the method comprising:
   (a) receiving a request from a user at a node of a server proxy cluster;
   (b) determining whether an active session is established for the user;
   (c) sending the request to the server if an active session is established for the user; and
   (d) updating at least one node of the server proxy cluster with information that the active session is established for the user;
   wherein said updating includes updating at least one of the nodes of the server proxy cluster based on a probability function that increases with a number of nodes of the server proxy cluster.

3. An apparatus for accessing a server in a global distributed network, comprising:
   (a) means for receiving a request from a user at a node of a server proxy cluster;
   (b) means for determining whether an active session is established for the user;
   (c) means for sending the request to the server if an active session is established for the user; and
   (d) means for updating at least one node of the server proxy cluster with information that the active session is established for the user;
   wherein said means for updating includes means for updating at least one of the nodes of the server proxy cluster based on a probability function that increases with a timer value at a node of the server proxy cluster.

4. An apparatus for accessing a server in a global distributed network, comprising:
   (a) means for receiving a request from a user at a node of a server proxy cluster;
   (b) means for determining whether an active session is established for the user;
   (c) means for sending the request to the server if an active session is established for the user; and
   (d) means for updating at least one node of the server proxy cluster with information that the active session is established for the user;
   wherein said means for updating includes means for updating at least one of the nodes of the server proxy cluster based on a probability function that increases with a number of nodes of the server proxy cluster.

5. A computer-readable medium embodying a method for accessing a server in a global distributed network, the method comprising:
   (a) receiving a request from a user at a node of a server proxy cluster;
   (b) determining whether an active session is established for the user;
   (c) sending the request to the server if an active session is established for the user; and
   (d) updating at least one node of the server proxy cluster with information that the active session is established for the user;
   wherein said updating includes updating at least one of the nodes of the server proxy cluster based on a probability function that increases with a timer value at a node of the server proxy cluster.

6. A computer-readable medium embodying a method for accessing a server in a global distributed network, the method comprising:
   (a) receiving a request from a user at a node of a server proxy cluster;
   (b) determining whether an active session is established for the user;
   (c) sending the request to the server if an active session is established for the user; and (c) updating at least one node of the server proxy cluster with information that the active session is established for the user;

wherein said updating includes updating at least one of the nodes of the server proxy cluster based on a probability function that increases with a number of nodes of the server proxy cluster.

7. A server proxy cluster for accessing a server in a global distributed network, comprising:

(a) receiving a request from a user at a node of a server proxy cluster;

(b) determining whether an active session is established for the user;

(c) sending the request to the server if an active session is established for the user; and (c) updating at least one node of the server proxy cluster with information that the active session is established for the user;

wherein said updating includes updating at least one of the nodes of the server proxy cluster based on a probability function that increases with a timer value at a node of the server proxy cluster.

8. A server proxy cluster for accessing a server in a global distributed network, comprising:

(a) receiving a request from a user at a node of a server proxy cluster;

(b) determining whether an active session is established for the user;

(c) sending the request to the server if an active session is established for the user; and (d) updating at least one node of the server proxy cluster with information that the active session is established for the user;

wherein said updating includes updating at least one of the nodes of the server proxy cluster based on a probability function that increases with a number of nodes of the server proxy cluster.

* * * * *